(12) United States Patent
Suzuki

(10) Patent No.: US 9,383,570 B2
(45) Date of Patent: *Jul. 5, 2016

(54) IMAGE ANALYSIS METHOD AND IMAGE ANALYSIS APPARATUS

(71) Applicant: OLYMPUS CORPORATION, Tokyo (JP)

(72) Inventor: Akemi Suzuki, Kokubunji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/527,987

(22) Filed: Oct. 30, 2014

(65) Prior Publication Data

US 2015/0054938 A1 Feb. 26, 2015

Related U.S. Application Data

(63) Continuation of application No. 13/168,544, filed on Jun. 24, 2011, now Pat. No. 8,908,993.

(30) Foreign Application Priority Data

Jun. 25, 2010 (JP) ................................. 2010-145607

(51) Int. Cl.
*G06K 9/00* (2006.01)
*G06K 9/34* (2006.01)
(Continued)

(52) U.S. Cl.
CPC .......... *G02B 21/367* (2013.01); *G06K 9/00127* (2013.01); *G06T 7/0022* (2013.01); *G06T 2207/10056* (2013.01); *G06T 2207/10064* (2013.01); *G06T 2207/30024* (2013.01)

(58) Field of Classification Search
CPC ................... G06T 7/0022; G06T 2207/10056; G06T 2207/10064; G06T 2207/30024; G06T 5/50; G06T 7/0012; G06B 21/367; G01N 21/6458; G01N 21/6408; G01J 3/4406; G01J 3/10; G01J 3/36; G06K 9/0014; G06K 9/00147; G06K 9/6202
USPC .......................................... 382/128, 173, 278
See application file for complete search history.

(56) References Cited

U.S. PATENT DOCUMENTS 5,249,238 A 9/1993 Komerath et al.
6,052,188 A * 4/2000 Fluckiger ............. G01N 21/211
356/369

(Continued)

FOREIGN PATENT DOCUMENTS

DE 10-2007-052551 A1 5/2009
JP 2004-279239 A 10/2004

(Continued)

OTHER PUBLICATIONS

Digman, Mlichelle et al., "Measuring Fast Dynamics in Solutions and Cells with a Laser Scanning Microscope," Biophysical Journal, Aug. 2005, vol. 89, pp. 1317-1327.

(Continued)

*Primary Examiner* — Kanjibhai Patel
(74) *Attorney, Agent, or Firm* — Westerman, Hattori, Daniels & Adrian, LLP

(57) ABSTRACT

An image analysis method includes acquiring images of spatially different analysis regions. Each of the images of the analysis regions is constituted by pixels including a plurality of data acquired simultaneously or time-serially. The method further includes obtaining a cross-correlation between two analysis regions by using data of pixels of images of the analysis regions.

15 Claims, 9 Drawing Sheets

(51) Int. Cl.
*G06K 9/64* (2006.01)
*G02B 21/36* (2006.01)
*G06T 7/00* (2006.01)

(56) References Cited

U.S. PATENT DOCUMENTS

| | | | |
|---|---|---|---|
| 6,980,294 B2 | 12/2005 | Namba et al. | |
| 7,345,767 B2 * | 3/2008 | Amaya | G01B 11/2441 356/445 |
| 7,355,701 B2 | 4/2008 | Ishibashi | |
| 7,605,918 B2 | 10/2009 | Dalrymple | |
| 7,884,324 B2 | 2/2011 | Blick et al. | |
| 7,978,403 B2 * | 7/2011 | Brueck | G02B 21/18 356/450 |
| 2006/0045505 A1 | 3/2006 | Zeineh et al. | |
| 2010/0225910 A1 | 9/2010 | Wagner-Conrad et al. | |

FOREIGN PATENT DOCUMENTS

| | | |
|---|---|---|
| JP | 2006-92401 A | 4/2006 |
| JP | 2007-093277 A | 4/2007 |
| JP | 2008-276191 A | 11/2008 |
| JP | 2010-217761 A | 9/2010 |
| JP | 2010-237116 A | 10/2010 |
| JP | 2010-281735 A | 12/2010 |
| JP | 2011-17677 A | 1/2011 |
| JP | 2011-85486 A | 4/2011 |
| WO | 2007/037253 A1 | 4/2007 |
| WO | 2008/087869 A1 | 7/2008 |
| WO | 2009/018337 A1 | 2/2009 |
| WO | 2011/046211 A1 | 4/2011 |
| WO | 2011/072624 A1 | 6/2011 |

OTHER PUBLICATIONS

Digman, Michelle A et al., "Detecting Protein Complexex in Living Cells from Laser Scanning Confocal Image Sequences by the Cross Correlation Raster Image Spectroscopy Method", Biophysical Journal, vol. 96, No. 2, Jan. 21, 2009, pp. 707-716, XP55007216.

European Search Report dated Oct. 31, 2011, issued in corresponding European Patent Application No. 11005007 (10 pages).

Kolin, David L. et al., "Advances in Image Correlation Spectroscopy: Measuring Number Densities, Aggregation States, and Dynamics of Fluorescently labeled Macromolecules in Cells", Cell Biochemistry and Biophysics, Totowa, NJ, US, vol. 49, Jan. 1, 2007, pp. 141-164, XP007906841.

Japanese Office Action dated Jan. 14, 2014, issued in corresponding Japanese Patent Application No. 2010-145607, w/English translation, (7 pages).

Japanese Office Action mailed May 27, 2014 issued in corresponding Japanese Patent Application No. 2010-145607. English translation (9 pages).

Japanese Office Action mailed Oct. 14, 2014, issued in corresponding Japanese Application No. 2010-145607; w/English translation. (5 pages).

* cited by examiner

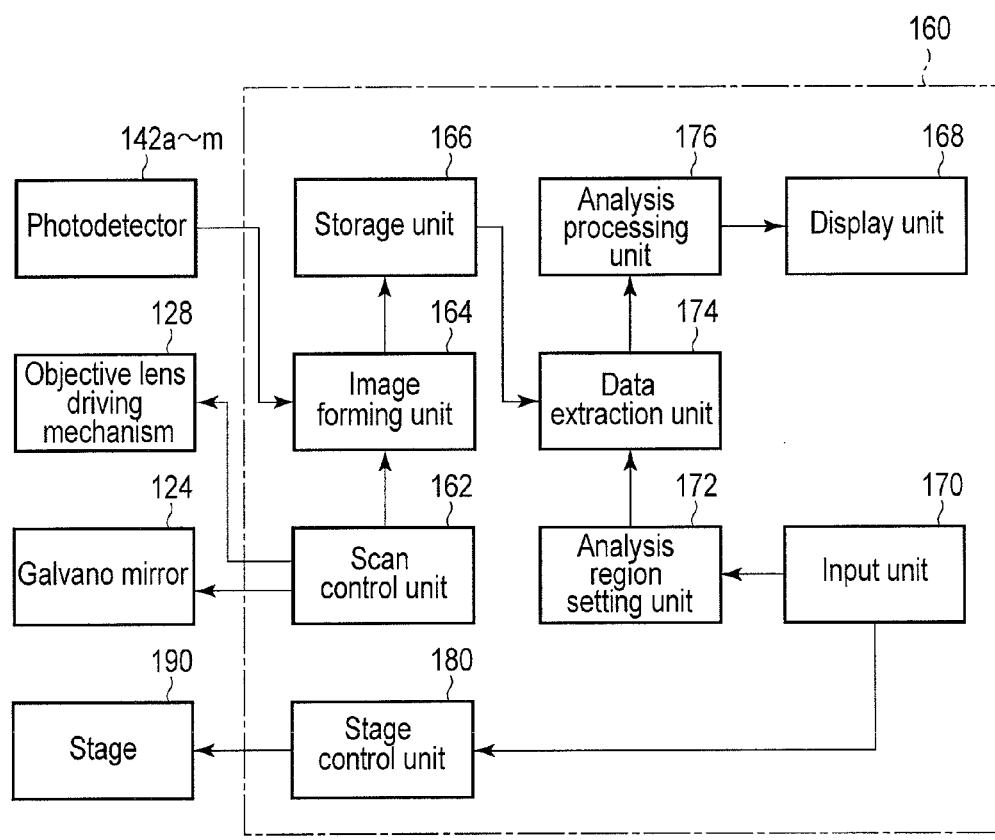
F I G. 2

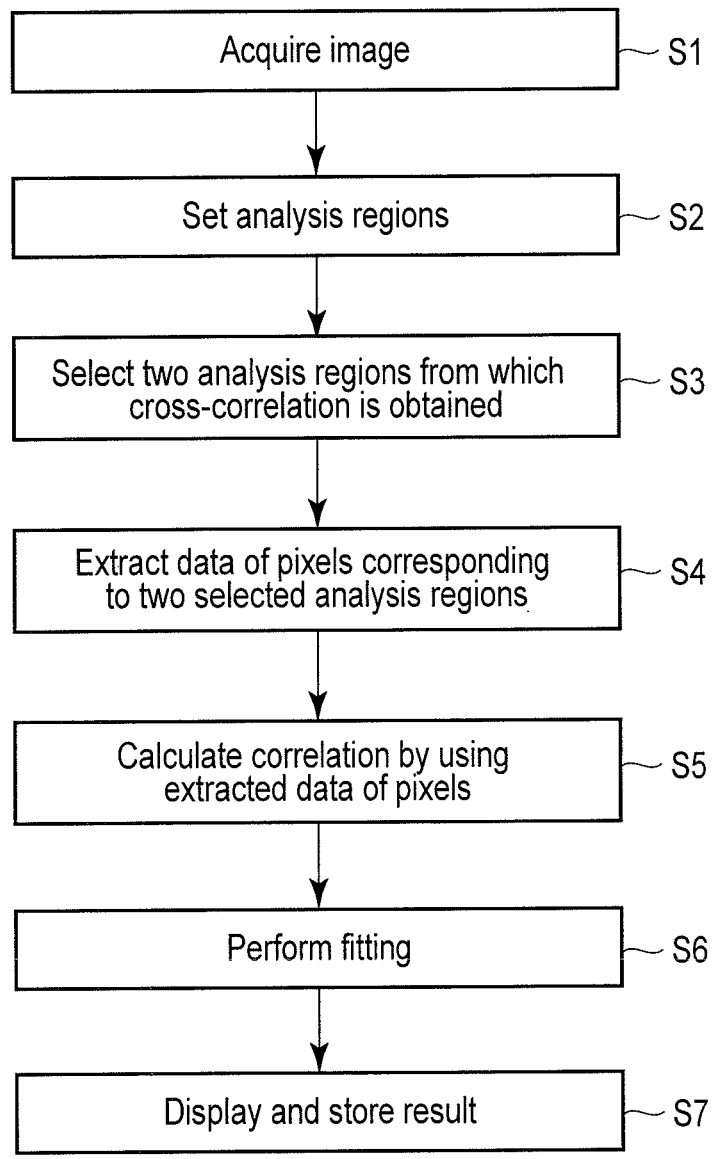
F I G. 5

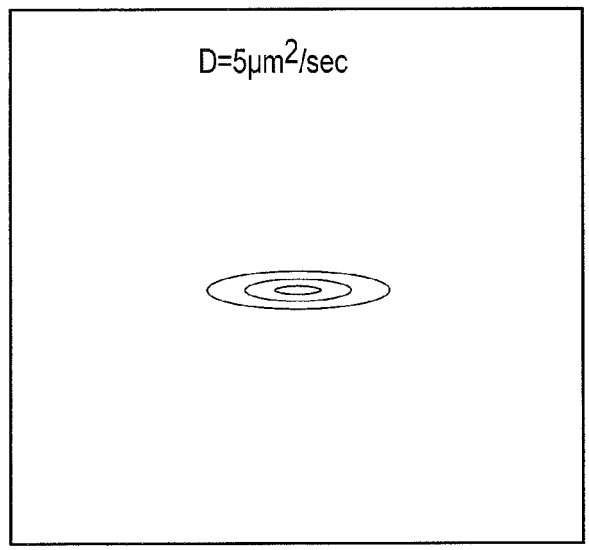
F I G. 10
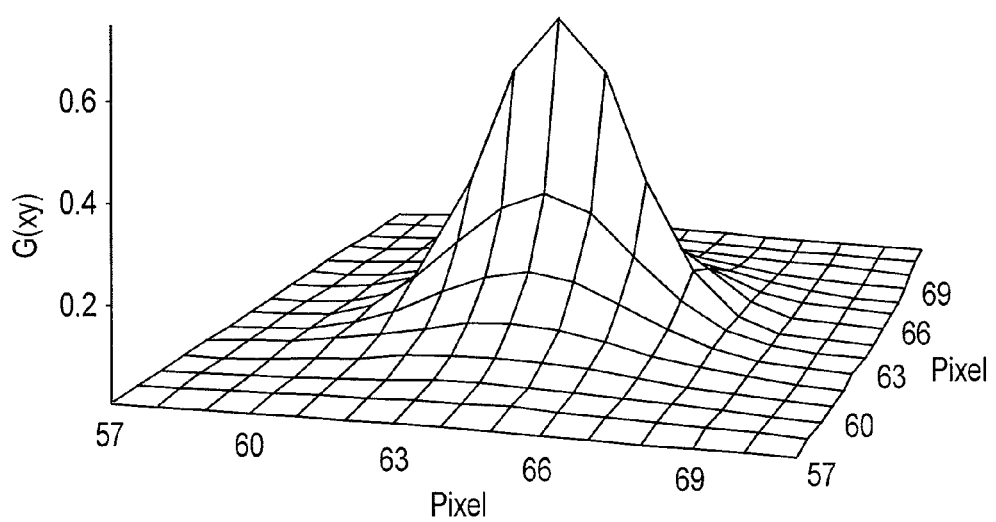
F I G. 11

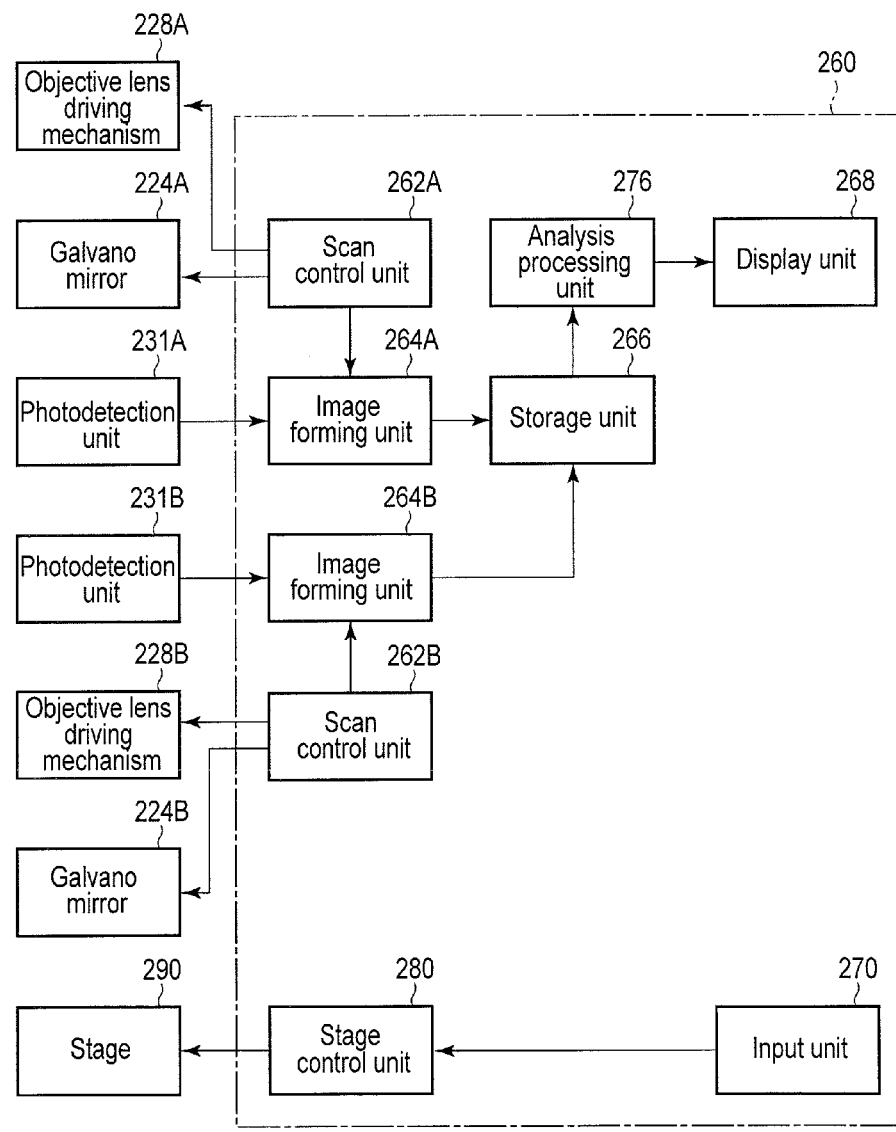
F I G. 13

IMAGE ANALYSIS METHOD AND IMAGE ANALYSIS APPARATUS

CROSS-REFERENCE TO RELATED APPLICATIONS

This application is a continuation of U.S. application Ser. No. 13/168,544, filed on Jun. 24, 2011, which is based upon and claims the benefit of priority from prior Japanese Patent Application No. 2010-145607, filed Jun. 25, 2010, which are hereby incorporated by reference in their entirety.

BACKGROUND OF THE INVENTION

1. Field of the Invention

The present invention relates to image analysis.

2. Description of the Related Art

An image analysis technique called fluorescence cross-correlation spectroscopy (FCCS) has been known. FCCS is disclosed in, for example, Michelle A. Digman, Claire M. Brown, Parijat Sengupta, Paul W. Wiseman, Alan R. Horwitz, and Enrico Gratton, "Measuring Fast Dynamics in Solutions and Cells with a Laser Scanning Microscope", Biophysical Journal, Vol. 89, pp. 1317-1327, August 2005. FCCS is designed to perform correlation analysis by continuously irradiating one or more measurement points in a sample with excitation light for a certain period of time (e.g., 10 sec) and detecting fluctuations in the intensity of fluorescence emitted from the measurement points, thereby estimating the number of molecules and a diffusion constant.

In addition, an image analysis technique called raster image correlation spectroscopy (RICS) is also known. RICS is disclosed in, for example, non-patent literature 2. RICS is designed to acquire a raster scanned image(s) of one or more frames. A raster scanned image can be, for example, a fluorescence image. The data of each pixel of a fluorescence image represents the information of the intensity of fluorescence emitted from a corresponding point in a sample. The data of pixels differ in acquisition time and position.

Correlation characteristics based on molecular fluctuations are obtained by performing spatial autocorrelation analysis using the data of these pixels. A diffusion constant and the number of molecules can be obtained from the correlation characteristics of molecules. A molecular diffusion time can be obtained from the diffusion constant. A molecular weight can be obtained from the molecular diffusion time.

Since a molecular weight, the number of molecules, and the like can be evaluated by performing spatial autocorrelation analysis in this manner, it is possible to observe interactions between molecules.

In FCCS, since measurement points in a sample are irradiated with excitation light for a relatively long period of time, the sample tends to be damaged. In addition, a target that can be analyzed is limited to a sample with a short diffusion time, and this analysis technique cannot be applied to a sample with a relatively long diffusion time.

In contrast to this, in RICS, since each point in a sample is irradiated with excitation light for a relatively short period of time, the damage of the sample is small. In addition, RICS can be effectively applied to a sample with a relatively long diffusion time.

Conventionally, an analysis based on RICS has been done to calculate the diffusion time of molecules (or the number of molecules) by using the image data of one region. The analysis result is the evaluation of the motions of molecules in the region. Such an analysis cannot evaluate the motions of molecules between different regions.

BRIEF SUMMARY OF THE INVENTION

According to an aspect of an embodiment, an image analysis method includes acquiring images of spatially different analysis regions. Each of the images of the analysis regions is constituted by pixels including a plurality of data acquired simultaneously or time-serially. The image analysis method further includes obtaining a cross-correlation between two analysis regions by using data of pixels of images of the analysis regions.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram showing the functional blocks of a control unit shown in FIG. 1;

FIG. 5 is a flowchart showing image analysis according to the first embodiment of the invention;

FIG. 10 is a view showing an image indicating the calculation results of spatial cross-correlation values associated with molecules in a sample by luminances;

FIG. 11 is a view showing the fitting result of the calculation results of the spatial cross-correlation values in FIG. 10;

FIG. 13 is a block diagram showing the functional blocks of a control unit shown in FIG. 12.

DETAILED DESCRIPTION OF THE INVENTION

The embodiments of the invention will be described below with reference to the views of the accompanying drawing.

First Embodiment

Apparatus Arrangement

Figure 1:
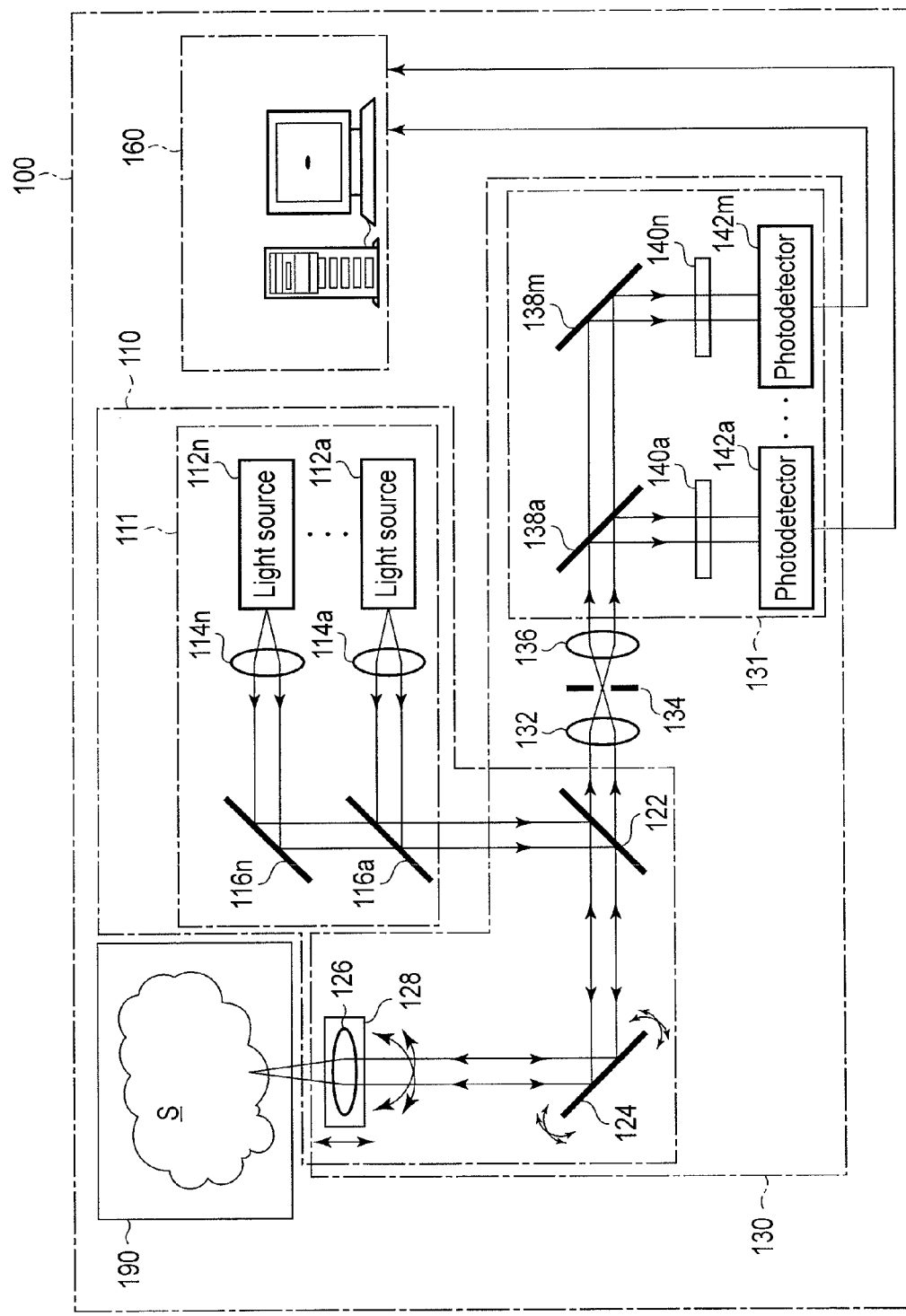
FIG. 1 is a view schematically showing an image analysis apparatus according to the first embodiment of the invention.

FIG. 1 is a view schematically showing an image analysis apparatus according to the first embodiment of the invention. This image analysis apparatus is configured based on a scanning confocal optical, microscope for fluorescent observation of a sample.

As shown in FIG. 1, an image analysis apparatus 100 includes a light irradiation unit 110 to apply light, e.g., excitation light, to a sample S, a photodetection unit 130 to detect light, e.g., fluorescence, from the sample S, a control unit 160 to perform necessary control for image analysis, and a sample stage 190 to support the sample S.

The sample S is contained in a sample container such as a microplate or a slide glass, and is placed on the sample stage 190. The sample stage 190 supports the sample S so as to allow it to be moved in the lateral direction (x and y directions) and height direction (z direction) relative to the light irradiation unit 110 and the photodetection unit 130. For example, the sample stage 190 includes three stepping motors whose output shafts are perpendicular to each other, so that the sample S can be moved in the x, y, and z directions by these stepping motors.

The image analysis apparatus 100 is, for example, of a multiple light irradiation/multiple light detection type. The light irradiation unit 110 includes an n-channel light source unit 111. The photodetection unit 130 includes an m-channel photodetection unit 131. The light source unit 111 has n channels and can emit excitation light beams having n different wavelengths. The photodetection unit 131 has m channels and can detect fluorescence beams having m different wavelengths. The light source unit 111 does not necessarily have a plurality of channels, and may have a single channel. In addition, the photodetection unit 131 does not necessarily have a plurality of channels, and may have a single channel.

The n-channel light source unit 111 of the light irradiation unit 110 includes light sources 112a, ..., 112n, collimator lenses 114a, ..., 114n, and dichroic mirrors 116a, ..., 116n. The light sources 112a, ..., 112n emit excitation light beams for exciting fluorescent dyes contained in the sample S to cause the sample S to emit light beams (fluorescence beams). The wavelengths of the excitation light beams emitted from the light sources 112a, ..., 112n correspond to the types of fluorescent dyes contained in the sample S and differ from each other. The light sources 112a, ..., 112n are constituted by, for example, laser light sources with oscillation wavelengths corresponding to the fluorescent dyes in the sample S. The collimator lenses 114a, ..., 114n respectively collimate the excitation light beams emitted from the light sources 112a, ..., 112n. The dichroic mirrors 116a, ..., 116n respectively reflect the excitation light beams passing through the collimator lenses 114a, ..., 114n in the same direction. The dichroic mirrors 116a, ..., 116n respectively transmit excitation light beams striking them from the upper side in FIG. 1, and reflect excitation light beams striking them from the right side in FIG. 1. As a result, the excitation light beams with different wavelengths, which are respectively emitted from the light sources 112a, ..., 112n, are combined into one beam after passing through the dichroic mirror 116a. The dichroic mirror 116n need not transmit any excitation light, and hence may be replaced with a simple mirror.

The light irradiation unit 110 further includes a dichroic mirror 122, a galvano mirror 124, an objective lens 126, and an objective lens driving mechanism 128. The dichroic mirror 122 reflects excitation light from the light source unit 111 toward the galvano mirror 124, and transmits fluorescence emitted from the sample S. The galvano mirror 124 reflects excitation light toward the objective lens 126 and changes its reflecting direction. The objective lens 126 converges excitation light and irradiates a measurement point in the sample S with the light, and captures light from the measurement point in the sample S. As the objective lens 126, a lens having a large NA (Numerical Aperture) is used to form a minute confocal region (measurement point). The confocal region obtained by this lens has a generally cylindrical shape with a diameter of about 0.6 μm (in an x-y plane) and a length of about 2 μm (in the z direction). The galvano mirror 124 constitutes an x-y scanning mechanism to scan a measurement point in the x and y directions. The x-y scanning mechanism may be constituted by using an acoustooptic modulator (AOM), a polygon mirror, a hologram scanner, and the like instead of being constituted by using a galvano mirror. The objective lens driving mechanism 128 moves the objective lens 126 along the optical axis. This moves a measurement point in the z direction. That is, the objective lens driving mechanism 128 constitutes a z scanning mechanism to scan a measurement point in the z direction.

The photodetection unit 130 commonly includes the objective lens 126, the galvano mirror 124, and the dichroic mirror 122 with the light irradiation unit 110. The photodetection unit 130 further includes a convergence lens 132, a pinhole 134, and a collimator lens 136. The convergence lens 132 converges light transmitted through the dichroic mirror 122. The pinhole 134 is placed at the focus of the convergence lens 132. That is, the pinhole 134 is placed at a position conjugate to a measurement point in the sample S, and selectively transmits light from only the measurement point. The collimator lens 136 collimates light passing through the pinhole 134. The light passing through the collimator lens 136 strikes the m-channel photodetection unit 131.

The m-channel photodetection unit 131 includes dichroic mirrors 138a, ..., 138m, fluorescence filters 140a, ..., 140m, and photodetectors 142a, ..., 142m. The dichroic mirrors 138a, ..., 138m selectively reflect light beams with wavelengths near the wavelength region of fluorescence to be detected, respectively. The dichroic mirror 138m need not transmit any light, and hence may be replaced with a simple mirror. The fluorescence filters 140a, ..., 140m respectively cut off unnecessary wavelength components of light from the light reflected by the dichroic mirrors 138a, ..., 138m, and selectively transmit only fluorescence beams generated by excitation light beams from the light sources 112a, ..., 112n. The fluorescence beams transmitted through the fluorescence filters 140a, ..., 140m respectively strike the photodetectors 142a, ..., 142m. The photodetectors 142a, ..., 142m output signals corresponding to the intensities of the incident light beams. That is, the photodetectors 142a, ..., 142m output fluorescence intensity signals from a measurement point in the sample S.

The control unit 160 is constituted by, for example, a personal computer. The control unit 160 performs acquisition/storage/display of a fluorescence image of an observation region of the sample S, waits for the input of settings of an analysis region, and performs image analysis processing (e.g., calculation of a correlation value and estimation of the number of molecules and a diffusion time). The control unit 160 controls the galvano mirror 124 as an x-y scanning mechanism, the objective lens driving mechanism 128 as a z scanning mechanism, the sample stage 190, and the like.

FIG. 2 shows the functional blocks of the control unit shown in FIG. 1. As shown in FIG. 2, the control unit 160 includes a scan control unit 162, an image forming unit 164, a storage unit 166, a display unit 168, an input unit 170, an analysis region setting unit 172, a data extraction unit 174, an analysis processing unit 176, and a stage control unit 180. The scan control unit 162, the image forming unit 164, the storage unit 166, and the stage control unit 180 constitute an observation region image acquisition unit in cooperation with the light irradiation unit 110 and the photodetection unit 130, which have been described above. This observation region image acquisition unit further constitutes an analysis region image acquisition unit in cooperation with the analysis region setting unit 172 and the data extraction unit 174.

The scan control unit 162 controls the galvano mirror 124 so as to raster-scan the irradiation position of excitation light on the sample S when acquiring a fluorescence image of the sample S. In addition, if necessary, the scan control unit 162 controls the objective lens driving mechanism 128 so as to z-scan the irradiation position of excitation light on the sample S. The image forming unit 164 forms a fluorescence image of the sample S from the information of the irradiation position of excitation light input from the scan control unit 162 and output signals from the photodetectors 142a, . . . , 142m. With this operation, a fluorescence image is acquired. The storage unit 166 stores the fluorescence image formed by the image forming unit 164. The display unit 168 displays a fluorescence image of the sample S and an analysis processing result. The input unit 170 includes, for example, a mouse and a keyboard, and constitutes a GUI in cooperation with the display unit 168. This GUI is used to set, for example, an observation region and analysis regions. The stage control unit 180 controls the sample stage 190 to set, for example, an observation region in accordance with input information from the input unit 170. The analysis region setting unit 172 sets analysis regions in accordance with input information from the input unit 170. The data extraction unit 174 extracts the data of two analysis regions between which a correlation is obtained. The analysis processing unit 176 obtains a cross-correlation by using the data of pixels of images of two analysis regions. The processing performed by this analysis processing unit 176 will be described in detail later.

Referring to FIG. 1, the excitation light beams emitted from the light sources 112a, . . . , 112n are applied to a measurement point in the sample S through the collimator lenses 114a, . . . , 114n, the dichroic mirrors 116a, . . . , 116n, the dichroic mirror 122, the galvano mirror 124, and the objective lens 126. The measurement point to which excitation light beams are applied is raster-scanned by the galvano mirror 124 in the x and y directions. In addition, if necessary, the measurement point is z-scanned by the objective lens driving mechanism 128 every time one raster scan is complete. The measurement point is scanned over an observation region. The sample S emits fluorescence from the measurement point upon receiving excitation light. The light (including undesired reflected light in addition to fluorescence) from the sample S reaches the pinhole 134 through the objective lens 126, the galvano mirror 124, the dichroic mirror 122, and convergence lens 132. Since the pinhole 134 is placed at a position conjugate to the measurement point, only light from the measurement point in the sample S passes through the pinhole 134. The light passing through the pinhole 134, i.e., the light from the measurement point in the sample S, strikes the m-channel photodetection unit 131 through the collimator lens 136. The light that has struck the m-channel photodetection unit 131 is separated in accordance with the wavelengths (that is, spectroscoped) by the dichroic mirrors 138a, . . . , 138m, and undesired components are removed by the fluorescence filters 140a, . . . , 140m. The fluorescence beams passing through the fluorescence filters 140a, . . . , 140m respectively strike the photodetectors 142a, . . . , 142m. The photodetectors 142a, . . . , 142m respectively output fluorescence intensity signals indicating the intensities of the incident light beams, i.e., the fluorescence beams emitted from the measurement point in the sample S. The fluorescence intensity signals are input to the image forming unit 164. The image forming unit 164 processes the input fluorescence intensity signals in synchronism with position information in the x and y directions (also in the z direction) to form a fluorescence image of the observation region in the sample S. The formed fluorescence image is stored in the storage unit 166. The fluorescence image stored in the storage unit 166 is directly displayed on the display unit 168 or processed by the analysis processing unit 176 to display the analysis processing result on the display unit 168.

[Observation Region and Spatial Correlation Calculating Formula]

A fluorescence image of an observation region is constituted by pixels having a plurality of data acquired time-serially. In practice, a measurement point has a spatial spread in the x, y, and z directions. A pixel has a size corresponding to the spatial spread of this measurement point. If the observation region is a two-dimensional region, the fluorescence image is a two-dimensional image in which pixels having sizes in the x and y directions are arrayed two-dimensionally. If the observation region is a three-dimensional region, the fluorescence image is a three-dimensional image in which pixels having sizes in the x, y, and z directions are arrayed three-dimensionally. From a different viewpoint, a three-dimensional image is constituted by two-dimensional images at different z positions.

Figure 3:
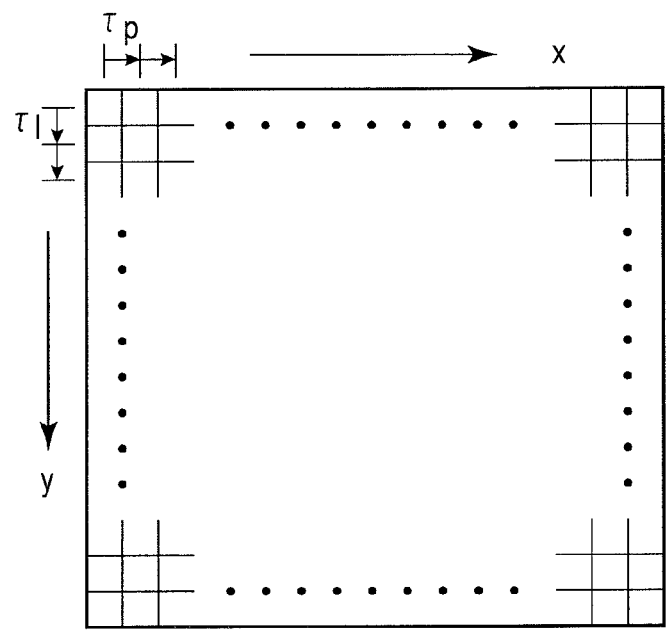
FIG. 3 is a view showing an example of a fluorescence image of a two-dimensional image.

FIG. 3 shows an example of a two-dimensional image. Referring to FIG. 3, reference symbol $\tau_p$ denotes a pixel time, the acquisition time difference between a given pixel and the next pixel adjacent to the given pixel. That is, the pixel time $\tau_p$ is the time required to acquire the data of one pixel. Reference symbol $\tau_l$ denotes a line time, the acquisition time difference between the first pixel on a given line and the first pixel on the next line. That is, the line time $\tau_l$ indicates the time required to scan one line.

Equation (1) given below represents a spatial cross-correction calculating formula used for RICS analysis used for a two-dimensional image. Equation (1) is an example of a cross-correlation calculating formula for an analysis region 1 and an analysis region 2.

$$G_s(\xi, \psi) = \frac{\Sigma I_1(x, y) * I_2(x+\xi, y+\psi)/M_{12}}{(\Sigma I_1(x, y)/M_1)(\Sigma I_2(x, y)/M_2)} \quad (1)$$

where $G_s$ is a spatial cross-correlation value of RICS, $I_1$ is the data of a pixel of an image of the analysis region 1, e.g., fluorescence intensity data, $I_2$ is the data of a pixel of an image of the analysis region 2, e.g., fluorescence intensity data, x and y are the spatial coordinates of the measurement point, $\xi$ and $\psi$ are the changes of the spatial coordinates from the measurement point, $M_{12}$ is the number of times of sum-of-product calculation of the data of the analysis region 1 and the analysis region 2, $M_1$ is the total number of data of the analysis region 1, and $M_2$ is the total number of data of the analysis region 2.

Equation (2) represents a fitting formula used for RICS analysis on a two-dimensional image.

$$G_s(\xi, \psi) = S(\xi, \psi) * G(\xi, \psi) \qquad (2)$$

$$S(\xi, \psi) = \exp\left(-\frac{\frac{1}{2} * \left[\left(\frac{2\xi\delta_r}{W_0}\right)^2 + \left(\frac{2\psi\delta_r}{W_0}\right)^2\right]}{\left(1 + \frac{4D(\tau_p\xi + \tau_l\psi)}{W_0^2}\right)}\right)$$

$$G(\xi, \psi) = \frac{1}{N}\left(\left(1 + \frac{4D(\tau_p\xi + \tau_l\psi)}{W_0^2}\right)^{-1} * \left(1 + \frac{4D(\tau_p\xi + \tau_l\psi)}{W_z^2}\right)^{-1/2}\right)$$

where $G_s$ is a spatial cross-correlation value of RICS, S is the influence of a scan in RICS analysis, G is the influence of a time delay in RICS analysis, D is a diffusion constant, $\delta_r$ is a pixel size, N is the number of molecules, $\xi$ and $\psi$ are the changes of the spatial coordinates from the measurement point, $W_0$ is the radius of an excitation laser beam in the lateral direction, $W_z$ is the radius of an excitation laser beam in the longitudinal direction, $\tau_p$ is the pixel time, and $\tau_l$ is the line time.

Figure 4:
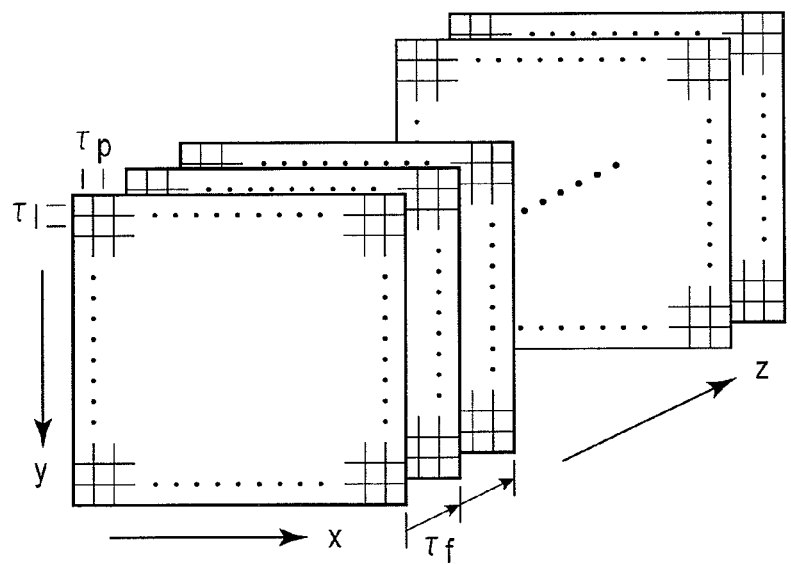
FIG. 4 is a view showing an example of fluorescence images of a three-dimensional image.

FIG. 4 shows an example of a three-dimensional image. Referring to FIG. 4, reference symbol $\tau_p$ denotes the pixel time; $\tau_l$, the line time; and $\tau_f$, a frame time, the acquisition time difference between the first pixel of a given frame and the first pixel of the next frame. That is, the frame time $\tau_f$ indicates the time required to scan one frame.

Equation (3) given below represents a spatial cross-correlation calculating formula used for RICS analysis on a three-dimensional image. Equation (3) is an example of a cross-correlation calculating formula for the analysis region 1 and the analysis region 2.

$$G_s(\xi, \psi, \eta) = \frac{\Sigma I_1(x, y, z) * I_2(x + \xi, y + \psi, z + \eta) / M_{12}}{(\Sigma I_1(x, y, z) / M_1)(\Sigma I_2(x, y, z) / M_2)} \qquad (3)$$

where $G_s$ is a spatial cross-correlation value of RICS, $I_1$ is the data of a pixel of an image of the analysis region 1, e.g., fluorescence intensity data, $I_2$ is the data of a pixel of an image of the analysis region 2, e.g., fluorescence intensity data, x, y, and z are the spatial coordinates of the measurement point, $\xi$, $\psi$, and $\eta$ are the changes of the spatial coordinates from the measurement point, $M_{12}$ is the number of times of sum-of-product calculation of the data of the analysis region 1 and the analysis region 2, $M_1$ is the total number of data of the analysis region 1, and $M_2$ is the total number of data of the analysis region 2.

Equation (4) represents a fitting formula used for RICS analysis on a three-dimensional image.

$$G_s(\xi, \psi, \eta) = S(\xi, \psi, \eta) * G(\xi, \psi, \eta) \qquad (4)$$

$$S(\xi, \psi, \eta) = \exp\left(-\frac{\frac{1}{2} * \left[\left(\frac{2\xi\delta_r}{W_0}\right)^2 + \left(\frac{2\psi\delta_r}{W_0}\right)^2 + \left(\frac{2\eta\delta_r}{W_0}\right)^2\right]}{\left(1 + \frac{4D(\tau_p\xi + \tau_l\psi + \tau_f\eta)}{W_0^2}\right)}\right)$$

$$G(\xi, \psi, \eta) =$$
$$\frac{1}{N}\left(\left(1 + \frac{4D(\tau_p\xi + \tau_l\psi + \tau_f\eta)}{W_0^2}\right)^{-1} * \left(1 + \frac{4D(\tau_p\xi + \tau_l\psi + \tau_f\eta)}{W_z^2}\right)^{-1/2}\right)$$

where $G_s$ is a spatial cross-correlation value of RICS, S is the influence of a scan in RICS analysis, G is the influence of a time delay in RICS analysis, D is a diffusion constant, $\delta_r$ is a pixel size, N is the number of molecules, $\xi$, $\psi$, and $\eta$ are the changes of the spatial coordinates, $W_0$ is the radius of an excitation laser beam in the lateral direction, $W_z$ is the radius of an excitation laser beam in the longitudinal direction, $\tau_p$ is the pixel time, $\tau_l$ is the line time, and $\tau_f$ is the frame time.

[Measurement Procedure]

An image analysis procedure will be described below with reference to FIG. 5. Each step will be described with reference to FIGS. 6, 7, 8, 9, 10, and 11, as needed.

(Step S1)

A fluorescence image(s) of one or more frames of an observation region of the sample S is acquired. A fluorescence image is acquired through one channel of the light source unit 111 and one corresponding channel of the photodetection unit 131. An observation region is a two-dimensional or three-dimensional region. Accordingly, a fluorescence image is a two-dimensional or three-dimensional image. In the case of a two-dimensional image, the fluorescence image shown in FIG. 3 corresponds to one frame. In the case of a three-dimensional image, the fluorescence images shown in FIG. 4 correspond to one frame. The data of each pixel of a fluorescence image is, for example, the intensity of fluorescence emitted from the corresponding measurement point.

(Step S2)

Figure 6:
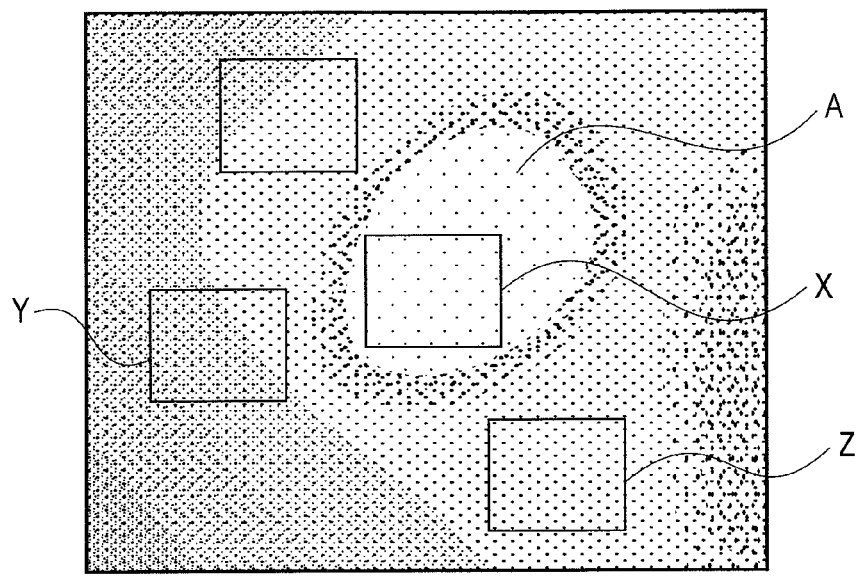
FIG. 6 is a view showing an observation region and analysis regions set in the observation region.

As shown in FIG. 6, analysis regions are set for a fluorescence image(s) of each frame of the observation region. The analysis regions are spatially different regions, which are generally spaced apart from each other and do not overlap. Each analysis region is a two-dimensional region for a two-dimensional observation region, and is generally a three-dimensional region but may be a two-dimensional region for a three-dimensional observation region. Note that FIG. 6 shows the interior of one cell, and an elliptic portion A of a central portion indicates the nucleus.

(Step S3)

Figure 7:
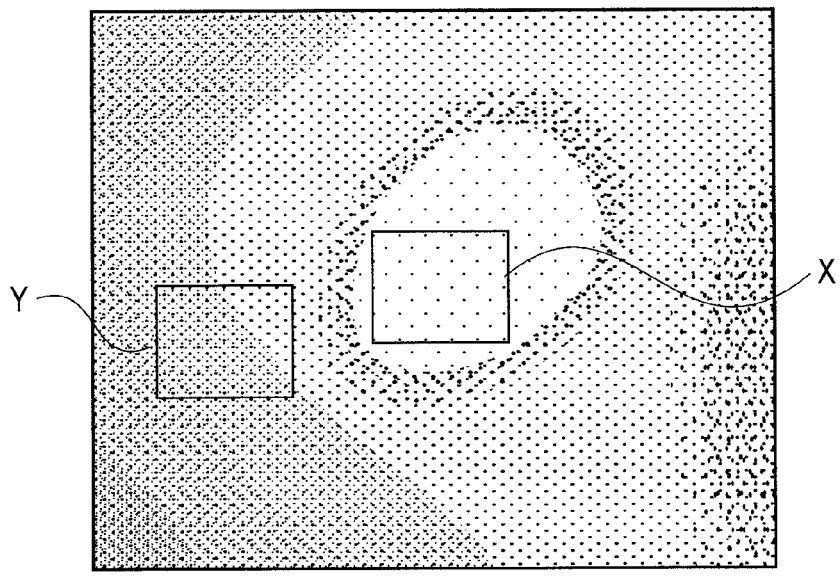
FIG. 7 is a view showing an observation region and two analysis regions between which a cross-correlation is obtained.

As shown in FIG. 7, two analysis regions (an analysis region 1 and an analysis region 2) between which a spatial cross-correlation is obtained are selected for the fluorescence image(s) of one frame of the observation region. In this case, a region X inside the nucleus is selected as the analysis region 1, and a region Y outside the nucleus is selected as the analysis region 2.

(Step S4)

The data of pixels corresponding to the two analysis regions (the analysis region 1 and the analysis region 2) are extracted.

(Step S5)

A correlation is calculated by using the extracted data of the pixels. The spatial cross-correlation calculating formula given by equation (1) is used for a two-dimensional image. The spatial cross-correlation calculating formula given by equation (3) is used for a three-dimensional image.

The data of each pixel used for correlation calculation may be the data of the pixel of interest itself or the statistical value of the data of pixels including the pixel of interest. The pixels may include the pixel of interest and its adjacent pixels. A statistical value may be, for example, any one of an average value, a maximum value, a minimum value, a relative difference, an absolute difference, and a relative ratio of the data of the pixels. Depending on which kind of information to be obtained by RICS analysis will determine which kind of statistical value is to be used.

In addition, data to be used for correlation calculation may be any one of a pixel time, a line time, a frame time, a pixel positional relationship, a pixel size, and its statistical value.

Correlation calculation may be performed for the images obtained by reconstructing images based on the data of pixels. For example, the data of adjacent pixels are added to decrease the number of data of pixels to half. Alternatively, the data of one pixel is divided into parts. Although the number of data of pixels does not normally increase once an image is acquired, pixel data that cannot be normally obtained is compensated by assuming that the intensities of the acquired data of a pixel are distributed around the data of the pixel in a Gaussian distribution. Although the number of data of each pixel does not essentially increase, the appearance of the image is improved.

(Step S6)

Fitting is performed for the correlation calculation result obtained in step S5 to estimate at least one of the number of molecules and a diffusion time. The fitting equation given by equation (2) is used for a two-dimensional image, whereas the fitting equation given by equation (4) is used for a three-dimensional image.

More specifically, the cross-correlation values $G_s$ corresponding to different delay times are obtained by using equation (1) or (3). A diffusion constant and the number of molecules are then obtained from the relationship between the cross-correlation values $G_s$ and the delay times by using equation (2) or (4).

In practice, the number of molecules and a diffusion constant are obtained by a residue comparison (fitting) between the results of correlation calculation of the theoretical values of equations (2) and (4) and measured values. In fitting, first of all, (a) $G_s$ obtained as a theoretical value (to be referred to as the theoretical correlation value $G_s$ hereinafter) is calculated by using the predetermined diffusion constant D and the number N of molecules. (b) The theoretical correlation value $G_s$ is then compared with the correlation value $G_s$ obtained as a measured value (to be referred to as the measured correlation value $G_s$ hereinafter) to calculate the residue between them. (c) The new theoretical correlation value $G_s$ is calculated by changing the diffusion constant D and the number N of molecules in the theoretical correlation value $G_s$. (d) The new theoretical correlation value $G_s$ is compared with the measured correlation value $G_s$ to calculate the residue between them. (e) The residue obtained in (b) is compared with the residue obtained in (d) to determine whether the residue has increased or decreased. In this manner, in fitting, (b) to (e) are repeated while the diffusion constant D and the number N of molecules in the theoretical correlation value $G_s$ are changed, thereby finally obtaining the theoretical correlation value $G_s$ that minimizes the residue between the measured correlation value $G_s$ and the theoretical correlation value $G_s$. The diffusion constant D and the number N of molecules in the finally obtained theoretical correlation value $G_s$ are the diffusion constant D and the number N of molecules in the measured correlation value $G_s$. As described above, fitting based on equation (2) or (4) is to estimate the optimal number of molecules or diffusion constant in a two-dimensional or three-dimensional observation region while changing the diffusion constant D and the number N of molecules in the theoretical correlation value $G_s$.

Diffusion constants and diffusion times have the relationship represented by equation (5) given below. A diffusion time can therefore be obtained from an obtained diffusion constant.

$$\tau = W_0^2 / 4D \qquad (5)$$

(Step S7)

Figure 8:
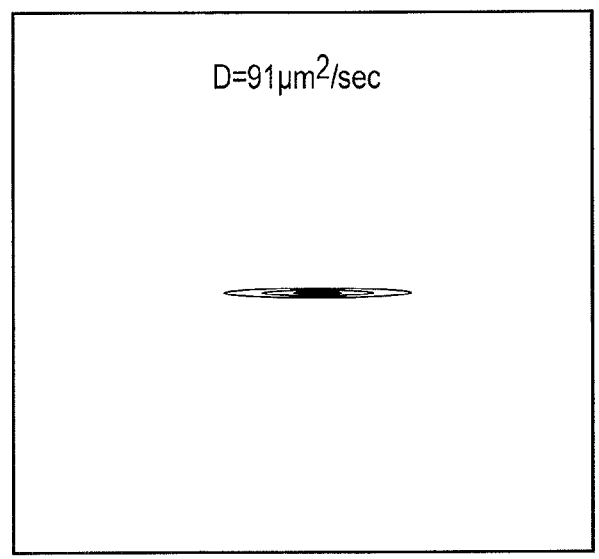
FIG. 8 is a view showing an image indicating the calculation result of spatial cross-correlation values associated with molecules in a sample by luminances.
Figure 9:
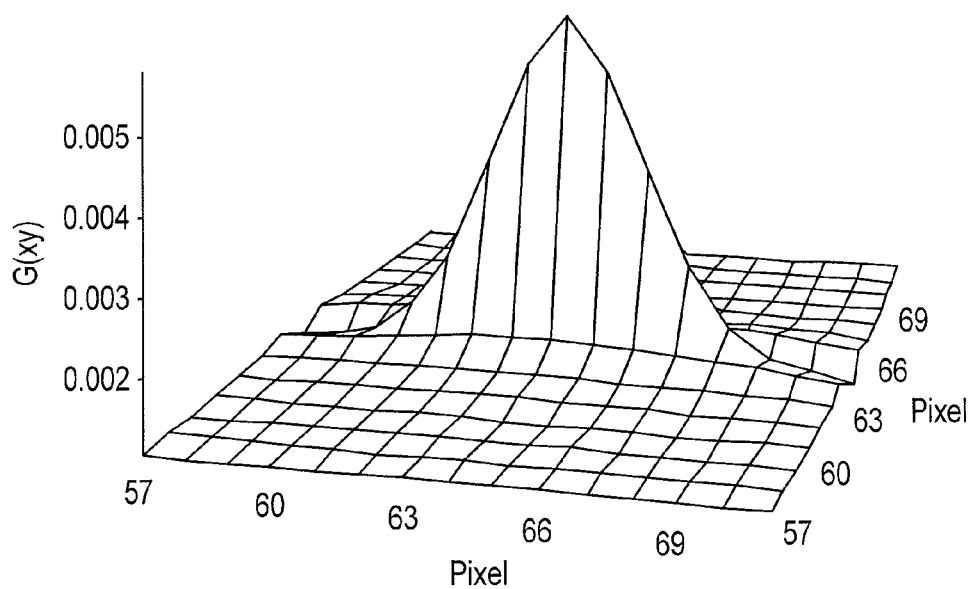
FIG. 9 is a view showing the fitting result of the calculation results of the spatial cross-correlation values in FIG. 8.

The image based on the number of molecules or diffusion constant is displayed and stored. FIGS. 8, 9, 10, and 11 each show an example of an analysis result. FIGS. 8 and 10 each show an example of displaying the calculation results of spatial cross-correlation values associated with molecules in the sample S as an image on a CRT. FIGS. 9 and 11 each show the fitting result of the calculation results of the spatial cross-correlation values in FIGS. 8 and 10. FIGS. 8 and 10 each indicate the magnitudes of the spatial cross-correlation values by luminances on the CRT. Note that, referring to FIGS. 8 and 10, contour lines explicitly indicate changes in luminance (spatial cross-correlation value). In addition, FIGS. 8 (9) and 10 (11) differ in the combination of two analysis regions. The analysis results shown in FIGS. 8 and 9 indicate that the motions of molecules between the analysis region 1 (the region X in FIG. 6) and the analysis region 2 (the region Y in FIG. 6) are relatively fast. The analysis results shown in FIGS. 10 and 11 indicate that the motions of molecules between the analysis region 1 (the region X in FIG. 6) and the analysis region 2 (a region Z in FIG. 6) are relatively slow.

The above steps complete the analysis processing of the image for a combination of two analysis regions. Steps S3 to S7 are repeated for another combination of two analysis regions. Alternatively, steps S3 to S7 are repeated for another fluorescence images of observation regions of another frame.

According to this embodiment, it is possible to evaluate the motions of molecules between different regions in the sample S. In addition, obtaining spatial cross-correlations while sequentially changing a combination of analysis regions allows to two-dimensionally or three-dimensionally comprehend the motions of molecules between different regions in the sample S. For example, obtaining spatial cross-correlations between combinations of one analysis region and surrounding analysis regions allows to two-dimensionally or three-dimensionally comprehend the motions of molecules between the one analysis region and the surrounding analysis regions.

In this embodiment, fluorescence images are obtained by the scanning confocal optical microscope. In this case, images are formed time-serially, the time when a fluorescence image of the analysis region 1 is obtained differs from the time when a fluorescence image of the analysis region 2 is obtained. For this reason, fluorescence images obtained time-serially allow to evaluate the motions of molecules whose moving speeds are relatively low. Note that when images are formed simultaneously (when captured by a two-dimensional image sensing device such as a CCD or a CMOS), the time when a fluorescence image of the analysis region 1 is obtained coincides with the time when a fluorescence image of the analysis region 2 is obtained. In this case, it is possible to evaluate the motions of molecules whose moving speeds are relatively high.

Second Embodiment

Figure 12:
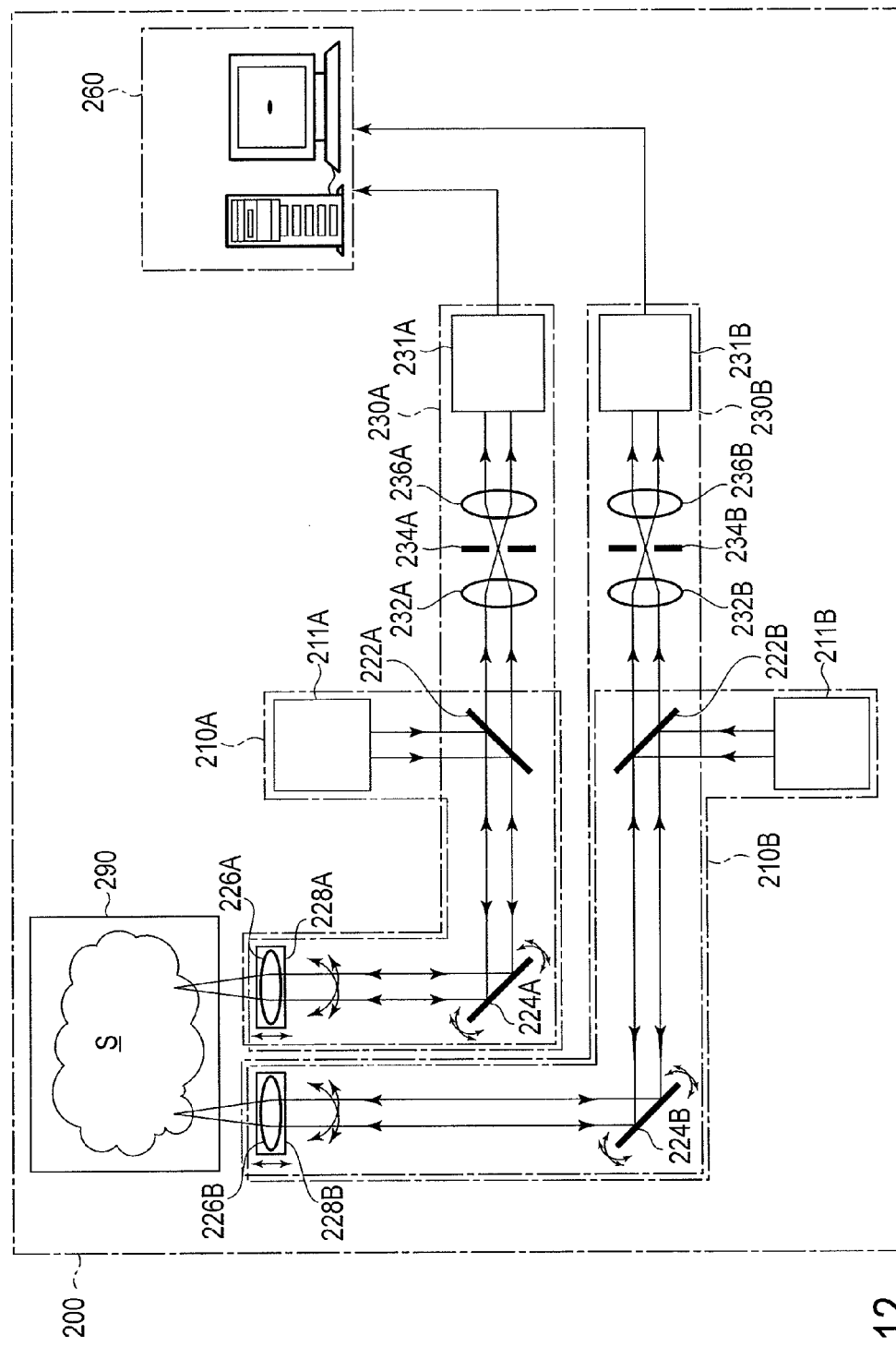
FIG. 12 is a view schematically showing an image analysis apparatus according to the second embodiment of the invention.

FIG. 12 schematically shows an image analysis apparatus according to the second embodiment of the invention. This image analysis apparatus is configured based on a scanning confocal optical microscope for fluorescent observation of a sample.

As shown in FIG. 12, an image analysis apparatus 200 includes two light irradiation units 210A and 210B to respectively apply light, e.g., excitation light, to a sample S, two photodetection units 230A and 230B to respectively detect light, e.g., fluorescence, from the sample S, a control unit 260 to perform necessary control for image analysis, and a sample stage 290 to support the sample S. The light irradiation units 210A and 210B respectively apply light beams to different regions in the sample S. The photodetection units 230A and 230B respectively detect light beams from the regions to which the excitation light beams are applied by the light irradiation units 210A and 210B.

The sample S is contained in a sample container such as a microplate or a slide glass, and is placed on the sample stage 290. The details of the sample stage 290 are the same as those of the sample stage 190 in the first embodiment.

The light irradiation units 210A and 210B respectively include light source units 211A and 211B, dichroic mirrors 222A and 222B, galvano mirrors 224A and 224B, objective lenses 226A and 226B, and objective lens driving mechanisms 228A and 228B. The details of the light source units 211A and 211B, dichroic mirrors 222A and 222B, galvano mirrors 224A and 224B, objective lenses 226A and 226B, and objective lens driving mechanisms 228A and 228B are the same as those of the light source unit 111, dichroic mirror 122, galvano mirror 124, objective lens 126, and objective lens driving mechanism 128 in the first embodiment.

The photodetection units 230A and 230B respectively commonly include the objective lenses 226A and 226B, the galvano mirrors 224A and 224B, and the dichroic mirrors 222A and 222B with the light irradiation units 210A and 210B. The photodetection units 230A and 230B also respectively include convergence lenses 232A and 232B, pinholes 234A and 234B, collimator lenses 236A and 236B, and photodetection units 231A and 231B. The convergence lenses 232A and 232B, the pinholes 234A and 234B, the collimator lenses 236A and 236B, and the photodetection units 231A and 231B are the same as the convergence lens 132, the pinhole 134, the collimator lens 136, and the photodetection unit 131 in the first embodiment.

The control unit 260 is constituted by, for example, a personal computer. The control unit 260 controls acquisition/storage/display of fluorescence images, waiting for the input of settings of analysis regions, image analysis processing, the galvano mirrors 224A and 224B as an x-y scanning mechanism, the objective lens driving mechanisms 228A and 228B as a z scanning mechanism, the sample stage 290, and the like.

FIG. 13 shows the functional blocks of the control unit shown in FIG. 12. As shown in FIG. 13, the control unit 260 includes scan control units 262A and 262B, image forming units 264A and 264B, a storage unit 266, a display unit 268, an input unit 270, an analysis processing unit 276, and a stage control unit 280. The scan control units 262A and 262B, the image forming units 264A and 264B, the storage unit 266, and the stage control unit 280 constitute an analysis region image acquisition unit in cooperation with the light irradiation units 210A and 210B and the photodetection units 230A and 230B.

The scan control units 262A and 262B control the galvano mirrors 224A and 224B so as to raster-scan the irradiation positions of excitation light beams on observation regions in the sample S. In addition, if necessary, the scan control units 262A and 262B control the objective lens driving mechanisms 228A and 228B so as to z-scan the irradiation positions of excitation light beams on the sample S. The image forming units 264A and 264B form fluorescence images of the sample S from the information of the irradiation positions of excitation light beams input from the scan control units 262A and 262B and output signals from the photodetection units 231A and 231B. With this operation, fluorescence images are acquired. The storage unit 266 stores the fluorescence images formed by the image forming units 264A and 264B. The display unit 268 displays the fluorescence images of the sample S and analysis processing results. The input unit 270 includes, for example, a mouse and a keyboard, and forms a GUI in cooperation with the display unit 268. This GUI is used to set, for example, an observation region. The stage control unit 280 controls the sample stage 290 to set, for example, an observation region in accordance with input information from the input unit 270. The analysis processing unit 276 obtains a cross-correlation by using the data of pixels of images of two observation regions acquired by the image forming units 264A and 264B.

The light irradiation units 210A and 210B, the photodetection units 230A and 230B, the scan control units 262A and 262B, and the image forming units 264A and 264B acquire fluorescence images of the respective observation regions by the same technique as that for acquiring fluorescence images in the first embodiment. Fluorescence images of two observation regions may be acquired simultaneously or at different timings.

The analysis processing unit 276 performs image analysis processing in the same manner as that for image analysis processing by the analysis processing unit 176 in the first embodiment except that the images of two analysis regions in the first embodiment are replaced by the images of two observation regions acquired by the image forming units 264A and 264B.

This embodiment has the same advantages as those of the first embodiment. In addition, simultaneously acquiring fluorescence images of two observation regions can obtain a more accurate spatial cross-correlation.

The embodiments of the invention have been described with reference to the views of the accompanying drawing. The invention is not limited to these embodiments and can be variously modified and changed within the spirit and scope of the invention.

For example, the embodiments have exemplified the analysis of images formed by detecting fluorescence emitted from the sample S, i.e., fluorescence images.

However, images to be analyzed are not limited to fluorescence images. In addition to fluorescence images, images to be analyzed may include, for example, images formed by detecting phosphorescence, reflected light, visible light, chemiluminescence, bioluminescence, and scattered light.

The embodiments have exemplified images acquired by raster scanning. However, images to be processed are not limited to those acquired by raster scanning, and may be any images that are constituted by pixels whose data are acquired time-serially, or may be images acquired by other scanning methods.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image analysis apparatus comprising:
   an analysis region image acquisition unit configured to acquire images of spatially different analysis regions in a sample, each of the images of the analysis regions being constituted by pixels including a plurality of data acquired time-serially, respectively;
   a correlation analysis unit configured to obtain a cross-correlation between two analysis regions by using data of pixels of the images of the analysis regions,
   the analysis region image acquisition unit including first and second optical systems configured to simultaneously acquire images of the analysis regions, respectively,
   the analysis region image acquisition unit comprising:
   an observation region image acquisition unit configured to acquire an image of an observation region including the analysis regions, the image of the observation region being constituted by pixels including a plurality of data acquired time-serially, respectively;

an analysis region setting unit configured to set the analysis regions for the image of the observation region; and a data extraction unit configured to extract data of pixels corresponding to the analysis regions from the image of the observation region, wherein the observation region image acquisition unit acquires images of frames of the observation region; and wherein the correlation analysis unit obtains the cross-correlation by using any one of a fluorescence intensity, a pixel time, a line time, a frame time, a pixel positional relationship, a pixel size, and a statistical value thereof.

2. The apparatus of claim 1, wherein the analysis region image acquisition unit acquires images of frames of the analysis regions.

3. The apparatus of claim 1, wherein the correlation analysis unit obtains the cross-correlation by using any one of a fluorescence intensity, a pixel time, a line time, a frame time, a pixel positional relationship, a pixel size, and a statistical value thereof.

4. The apparatus of claim 1, wherein the correlation analysis unit obtains the cross-correlation by using any one of an average value, a maximum value, a minimum value, a relative difference, and an absolute difference of the data.

5. The apparatus of claim 1, wherein the correlation analysis unit obtains the cross-correlation by using reconstructed data obtained by reconstructing the data.

6. The apparatus of claim 1, wherein each image of the analysis regions is a two-dimensional image, the two analysis regions, between which the cross-correlation is obtained, are an analysis region 1 and an analysis region 2, and the correlation analysis unit performs correlation calculation by using equation (1) and fitting for the correlation calculation result by using equation (2) to obtain the cross-correlation between the two-dimensional analysis regions:

$$G_s(\xi, \psi) = \frac{\Sigma I_1(x, y) * I_2(x+\xi, y+\psi)/M_{12}}{(\Sigma I_1(x, y)/M_1)(\Sigma I_2(x, y)/M_2)} \quad (1)$$

where $G_s$ is a spatial cross-correlation value of RICS, $I_1$ is data of a pixel of an image of the analysis region 1, $I_2$ is data of a pixel of an image of the analysis region 2, x and y are the spatial coordinates of a measurement point, $\xi$ and $\psi$ are the changes of the spatial coordinates from the measurement point, $M_{12}$ is the number of times of sum-of-product calculation of data of the analysis region 1 and the analysis region 2, $M_1$ is the total number of data of the analysis region 1, and $M_2$ is the total number of data of the analysis region 2

$$G_s(\xi, \psi) = S(\xi, \psi) * G(\xi, \psi) \quad (2)$$

$$S(\xi, \psi) = \exp\left(-\frac{\frac{1}{2}*\left[\left(\frac{2\xi\delta_r}{W_0}\right)^2 + \left(\frac{2\psi\delta_r}{W_0}\right)^2\right]}{\left(1+\frac{4D(\tau_p\xi+\tau_l\psi)}{W_0^2}\right)}\right)$$

$$G(\xi, \psi) = \frac{1}{N}\left(\left(1+\frac{4D(\tau_p\xi+\tau_l\psi)}{W_0^2}\right)^{-1} * \left(1+\frac{4D(\tau_p\xi+\tau_l\psi)}{W_z^2}\right)^{-1/2}\right)$$

where $G_s$ is a spatial correlation value of RICS, S is an influence of a scan in RICS analysis, G is an influence of a time delay in RICS analysis, D is a diffusion constant, $\delta_r$ is a pixel size, N is the number of molecules, $\xi$ and $\psi$ are the changes of spatial coordinates from a measurement point, $W_0$ is a radius of an excitation laser beam in a lateral direction $W_z$ is a radius of an excitation laser beam in a longitudinal direction, $\tau_p$ is a pixel time, and $\tau_l$ is a line time.

7. The apparatus of claim 1, wherein each image of the analysis region is a three-dimensional image, the two analysis regions, between which the cross-correlation is obtained, are an analysis region 1 and an analysis region 2, and the correlation analysis unit performs correlation calculation by using equation (3) and fitting for the correlation calculation result by using equation (4) to obtain the cross-correlation of the three-dimensional analysis regions:

$$G_s(\xi, \psi, \eta) = \frac{\Sigma I_1(x, y, z) * I_2(x+\xi, y+\psi, z+\eta)/M_{12}}{(\Sigma I_1(x, y, z)/M_1)(\Sigma I_2(x, y, z)/M_2)} \quad (3)$$

where $G_s$ is a spatial cross-correlation value of RICS, $I_1$ is data of a pixel of an image of the analysis region 1, $I_2$ is data of a pixel of an image of the analysis region 2, x, y, and z are the spatial coordinates of a measurement point, $\xi$, $\psi$, and $\eta$ are the changes of the spatial coordinates from the measurement point, $M_{12}$ is the number of times of sum-of-product calculation of data of the analysis region 1 and the analysis region 2, $M_1$ is the total number of data of the analysis region 1, and $M_2$ is the total number of data of the analysis region 2

$$G_s(\xi, \psi, \eta) = S(\xi, \psi, \eta) * G(\xi, \psi, \eta) \quad (4)$$

$$S(\xi, \psi, \eta) = \exp\left(-\frac{\frac{1}{2}*\left[\left(\frac{2\xi\delta_r}{W_0}\right)^2 + \left(\frac{2\psi\delta_r}{W_0}\right)^2 + \left(\frac{2\eta\delta_r}{W_0}\right)^2\right]}{\left(1+\frac{4D(\tau_p\xi+\tau_l\psi+\tau_f\eta)}{W_0^2}\right)}\right)$$

$$G(\xi, \psi, \eta) = \frac{1}{N}\left(\left(1+\frac{4D(\tau_p\xi+\tau_l\psi+\tau_f\eta)}{W_0^2}\right)^{-1} * \left(1+\frac{4D(\tau_p\xi+\tau_l\psi+\tau_f\eta)}{W_z^2}\right)^{-1/2}\right)$$

where $G_s$ is a spatial correlation value of RICS, S is an influence of a scan in RICS analysis, G is an influence of a time delay in RICS analysis, D is a diffusion constant, $\delta_r$ is a pixel size, N is the number of molecules, $\xi$, $\psi$, and $\eta$ are the changes of spatial coordinates, $W_0$ is a radius of an excitation laser beam in a lateral direction, $W_z$ is a radius of an excitation laser beam in a longitudinal direction, $\tau_p$ is a pixel time, $\tau_l$ is a line time, and $\tau_f$ is a frame time.

8. The apparatus of claim 1, wherein the analysis region image acquisition unit includes first and second light irradiation units configured to apply light beams to measurement points in the analysis regions, respectively.

9. The apparatus of claim 1, wherein the analysis region image acquisition unit includes first and second photodetection units configured to detect light beams from measurement points in the analysis regions, respectively.

10. The apparatus of claim 1, wherein the analysis region image acquisition unit includes
first and second light irradiation units configured to apply light beams to measurement points in the analysis regions, respectively, and
first and second photodetection units configured to detect light beams from the measurement points in the analysis regions, respectively.

11. The apparatus of claim 10, wherein each of the first and second light irradiation units includes a light source unit, a dichroic mirror, a galvano mirror, and an objective lens on its optical passes.

12. The apparatus of claim 11, wherein each of the first and second light irradiation units includes a driving mechanism configured to drive the corresponding objective lens.

13. The apparatus of claim 10, wherein each of the first and second photodetection units includes an objective lens, a galvano mirror, a convergence lens, a collimator lens, and a photodetection unit on its optical pass.

14. The apparatus of claim 11, wherein
the first photodetection unit includes the objective lens, galvano mirror, and dichroic mirror in the first light irradiation unit on its optical pass, and
the second photodetection unit includes the objective lens, galvano mirror, and dichroic mirror in the second light irradiation unit on its optical pass.

15. The apparatus of claim 12, wherein
each of the galvano mirror scans the corresponding measurement point in directions perpendicular to an optical axis of the corresponding objective lens,
each of the objective lens scans the corresponding measurement point in a direction parallel to the optical axis.

* * * * *